May 26, 1959  R. W. HAGEN  2,887,845

FUEL IGNITION APPARATUS

Filed Sept. 7, 1956

PRESSURE RESPONSIVE VALVE

INVENTOR
ROGER W. HAGEN
BY Ralph T. French
ATTORNEY

United States Patent Office 2,887,845
Patented May 26, 1959

2,887,845

FUEL IGNITION APPARATUS

Roger W. Hagen, Hickman Mills, Mo., assignor to Westinghouse Electric Corporation, East Pittsburgh, Pa., a corporation of Pennsylvania Application September 7, 1956, Serial No. 608,593

5 Claims. (Cl. 60—39.82)

This invention relates to fuel ignition apparatus, more particularly to fuel ignition apparatus wherein a "hotstreak" or pilot flame of short duration ignited by flame in a first fuel combustion system is provided for igniting the fuel in a second fuel combustion system; and has for an object to provide an improved "hotstreak" fuel ignition apparatus for igniting the fuel in the second fuel combustion system when the two fuel combustion systems are separated from each other by wall structure.

"Hotstreak" fuel ignition apparatus has been found highly advantageous and more reliable than electrical spark fuel ignition apparatus for igniting the afterburners of aviation turbojet engines, since in the event of failure of the electrical system the afterburner may still be ignited. However, in turbofan engines and similar turbojet engines, wherein it is desired to augment the propulsive thrust of the afterburner in the central gas passageway by providing an afterburner in the bypass duct, the problem becomes more complex due to the dividing wall between the bypass duct and the central passageway.

In view of the above, it is a further object of the invention to provide an improved "hotstreak" fuel ignition device for igniting an afterburner in the bypass duct of a turbofan jet engine.

A more specific object of the invention is to provide a "hotstreak" fuel ignition device of the above type which is simple in structure, may be economically and expeditiously fabricated, and which is durable and reliable in operation.

In aviation turbojet engines, the gas turbine is driven by gaseous products of combustion provided by primary fuel combustion structure and the exhaust gases are ejected through the rear exhaust nozzle of the engine to provide the forward propulsive thrust. Such engines may be provided with secondary fuel combustion structure interposed between the turbine and the exhaust nozzle for augmenting the thrust of the engine for brief intervals (such as when a sudden burst of speed is desired) by increasing the volume and/or the velocity of the exhaust gases. Afterburners of this type have been ignited by "hotstreak" fuel ignition apparatus comprising a fuel injection nozzle extending into the primary combustion apparatus for delivering an excess quantity of fuel thereto for a brief time interval, sufficient to cause an elongated flame to extend from the primary combustion structure to the secondary combustion structure, and timed to ignite the fuel being injected therein. Neal Patent No. 2,640,316, issued June 2, 1953 and assigned to the assignee of this invention is representative of such art.

In accordance with the invention, wherein it is desired to provide a "hotstreak" fuel ignition device for an additional fuel combustion structure (bypass afterburner) disposed in the bypass duct of a turbofan engine, a connecting duct is provided between the primary fuel combustion structure and the bypass duct. Within the connecting duct a slidable valve is provided which is normally in a position blocking the connecting duct but movable to the open position by fluid pressure. A "hotstreak" fuel ignitor nozzle extending into the bypass duct adjacent the connecting duct is connected to a source of fuel supply in such a manner that as fuel is delivered to the "hotstreak" fuel ignitor nozzle, the valve is actuated to the open position by fluid pressure, thereby permitting a streak of flame from the primary combustion structure to pass through the connecting duct and ignite the fuel issuing from the fuel ignitor nozzle. The flame from the fuel ignitor nozzle extends downstream in the bypass duct a sufficient length to ignite the fuel being injected into the bypass afterburner. After a brief ignition cycle is completed, fuel to the fuel ignitor nozzle is shut off and the valve-actuating fluid pressure is terminated, allowing the valve to again block the connecting duct. The fluid pressure for actuating the valve may be provided by the combustion gases from the primary combustion apparatus or by the fuel supply for the fuel ignitor nozzle.

These and other objects are effected by the invention as will be apparent from the following description and claims taken in connection with the accompanying drawings, forming a part of this application, in which:

Figure 1:
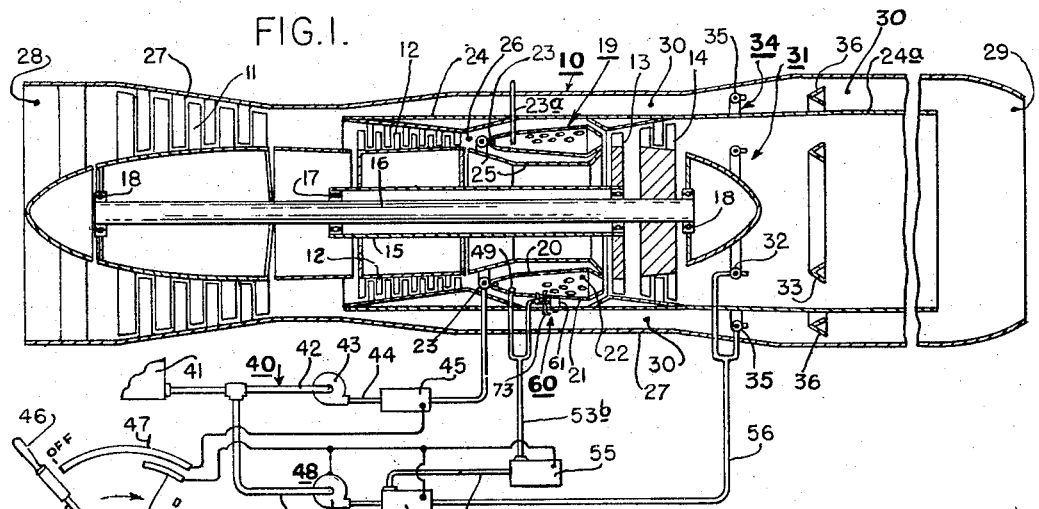
Fig. 1 is a diagrammatic axial sectional view of an aviation turbofan engine having the invention incorporated therein.

Referring to the drawing in detail, in Fig. 1 there is shown an aviation jet engine 10 of the turbofan type comprising a low pressure compressor rotor 11, a high pressure compressor rotor 12, a high pressure turbine rotor 13 and a low pressure turbine rotor 14. The high pressure turbine rotor 13 is connected to the high pressure compressor rotor 12 by a hollow shaft 15 through which extends an inner shaft 16 connecting the low pressure turbine rotor 14 to the low pressure compressor rotor 11. The shafts 15 and 16 are supported by suitable bearings 17 and 18 for independent rotation.

Between the high pressure compressor rotor 12 and the high pressure turbine rotor 13 there is interposed a primary fuel combustion structure 19 which, as illustrated, may be of the annular type comprising concentric inner and outer walls 20 and 21, respectively, defining an annular combustion chamber 22 and provided with suitable fuel injecting means 23 and electrical ignition means 23a.

The high pressure compressor rotor 12, the primary combustion structure 19, the high pressure turbine rotor 13 and the low pressure turbine rotor 14 are received within a tubular central shell structure 24 which, together with concentric inner core structure 25, provides a central annular passageway 26 for flow of gases. The low pressure compressor rotor is received within an elongated outer tubular shell structure 27, encompassing the central shell structure 24 and providing an air inlet 28 and an exhaust outlet 29. The outer shell 27 is of larger diameter than the central shell 24 and together therewith defines an annular passageway or bypass duct 30 which is in communication with the central gas passageway 26 at the air inlet to the high pressure compressor rotor 12.

Thus, as well known in the art, the hot gaseous products of combustion generated within the primary combustion structure 19 by combustion of fuel, admitted thereto by the fuel injecting means 23 and ignited by the ignition means 23a, motivate the high pressure turbine rotor 13 and low pressure turbine rotor 14 which, in turn, drive the high pressure compressor rotor 12 and the low pressure compressor rotor 11 which provide the compressed air required for combustion. The gases exhausted from the low pressure turbine rotor are then ejected through the exhaust outlet 29 to provide a propulsive thrust.

It will be noted that some of the compressed air from the low pressure compressor rotor 11 flows through the bypass duct 30 and joins the hot exhaust gases immediately upstream of the exhaust outlet 29, mixing therewith before final ejection.

In accordance with the usual practice, an auxiliary fuel combustion structure or main afterburner 31, comprising an annular fuel injecting manifold 32 and suitable flameholding structure 33, may be provided in the exhaust collector portion 24a of the central shell structure 24 for augmenting the volume and/or velocity of the hot gases exhausted by the low pressure turbine rotor 14. The afterburner 31 is employed for brief intervals when a short burst of additional power is desired. Hence, it readily lends itself to ignition by "hotstreak" ignition apparatus which may take the form more fully described and claimed in Neal Patent No. 2,640,316, previously mentioned.

An additional auxiliary fuel combustion structure 34 (hereinafter termed the bypass afterburner) is provided in the bypass duct 30 for augmenting the volume and/or velocity of the bypass air flow. The bypass afterburner 34 is similarly provided with an annular fuel injecting manifold 35 and suitable flameholding structure 36.

A fuel control system 40 for the engine 10 is schematically illustrated in Fig. 1, including a source of fuel 41, a supply conduit 42 connected to a main fuel pump 43 and a delivery conduit 44 connected to the primary fuel injecting means 23 through a fuel metering control mechanism 45. The fuel metering control mechanism 45 is regulated by a throttle lever 46 (shown in the "off" position) movable through a non-afterburning range from "off" to the maximum non-afterburning position 47.

A "hotstreak" fuel ignition control system 48 for igniting the main afterburner 31 may typically comprise a "hotstreak" fuel nozzle 49 disposed in the primary combustion structure 19 and fed by fuel delivered thereto by a branch supply conduit 50 (connected to the fuel source 41) an afterburner fuel pump 51, an afterburner fuel control mechanism 52 and a branch delivery conduit 53a, 53b having a "hotstreak" ignitor control mechanism 55 interposed therein. Fuel is delivered to the main afterburner fuel manifold 32 by a delivery conduit 56.

The "hotstreak" ignition control system 48 is controlled by the throttle lever 46 upon movement thereof into the afterburning range designated by numeral 57. Hence, in a known manner, when the throttle lever 46 is moved into the afterburning range 57, the afterburner fuel pump 51 is energized, thereby delivering fuel to the afterburner fuel control mechanism 52 from whence it is delivered in metered quantity to the main afterburner fuel manifold 32. Concomitantly therewith fuel is delivered by conduit 53a to the hotstreak ignitor control mechanism 55 and thence by conduit 53b to the "hotstreak" fuel nozzle 49 for a brief period, on the order of thirty seconds. As the fuel issues from the "hotstreak" fuel nozzle 49 into the primary combustion chamber 22, it is immediately ignited by the combustion flame therein and produces a large mass of flame which is swept downstream past the turbine rotors 13 and 14 and into the main afterburner 31 where it ignites the fuel being injected therein by the fuel manifold 32. At the end of the thirty-second ignition period, the ignitor control mechanism 55 terminates fuel flow to the "hotstreak" ignitor nozzle 49.

Although the above described hotstreak ignitor 49 is adequate for igniting the main afterburner 31, it is inadequate for igniting the bypass afterburner 34, since the bypass afterburner is separated from the main afterburner by the central shell structure 24.

Figures 2, 3, 6:
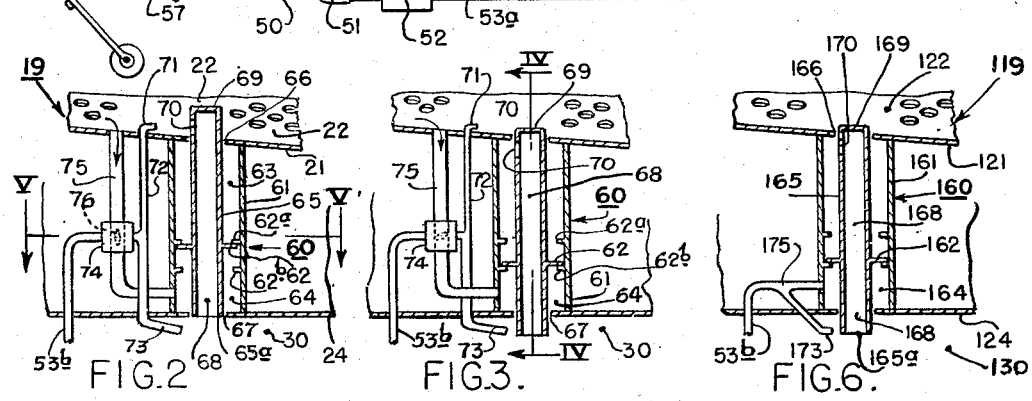
Fig. 2 is an enlarged fragmentary sectional view of the fuel ignition structure shown in Fig. 1, the fuel ignition structure being shown in the igniting position.
Fig. 3 is a view similar to Fig. 2 but showing the fuel ignition structure in the inactive position.
Fig. 6 is an enlarged fragmentary view similar to Fig. 3 but illustrating another embodiment of the invention.

In accordance with the invention, there is provided a novel "hotstreak" fuel ignition structure, generally designated 60, for igniting the bypass afterburner 34 which, as best shown in Figs. 2 and 3, comprises a tubular connecting duct member 61 extending from the outer wall 21 of the main fuel combustion structure to the central shell structure 24. Within the connecting duct member 61, there is slidably received a piston member 62 dividing the duct member 61 into two chambers 63 and 64 and having an axially extending tubular member 65 disposed in registry with a closely fitting aperture 66 in the combustion structure wall 21 and a similarly closely fitting aperture 67 in the central shell structure 24. The tubular member 65 is somewhat longer than the connecting duct member 61 and has a central bore 68 blocked at one end by a closure wall 69 but communicating with the exterior by means of a laterally disposed aperture 70.

Figure 5:
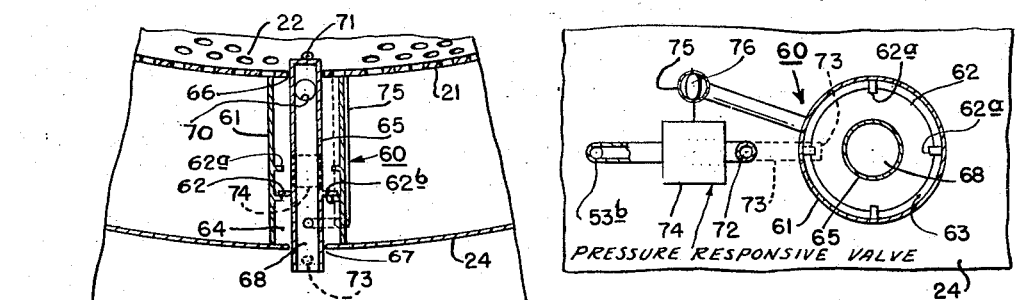
Fig. 5 is a fragmentary cross-sectional view taken on line V—V of Fig. 2.
Figure 4:
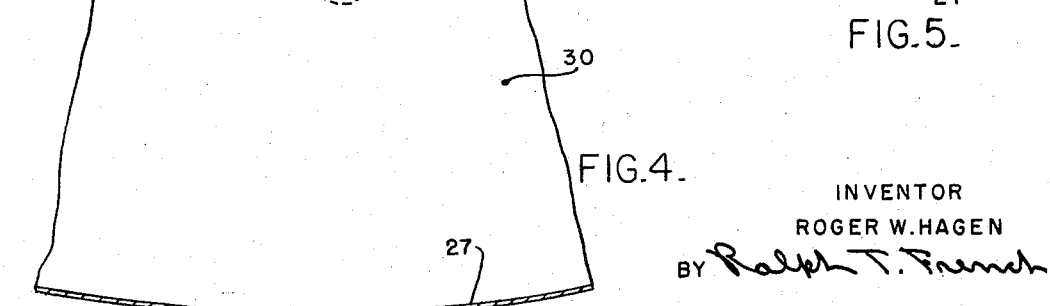
Fig. 4 is a sectional view taken on line IV—IV of Fig. 3.

A small pilot fuel nozzle 71, disposed in the main combustion chamber 22 and aligned in a manner to direct its flame toward the aperture 70, is connected by a fuel tube 72 to a "hotstreak" fuel ignitor nozzle 73 disposed in the bypass duct 30 adjacent the open end 65a of the tubular member 65 and aligned in a manner to direct its flame downstream toward the bypass afterburner 34. The fuel tube 72 is connected to the fuel delivery conduit 53b through a fuel pressure responsive valve 74. A conduit member 75 connects the main combustion chamber 22 to the connecting duct chamber 64. As shown in Fig. 5, the conduit member 75 extends past the pressure responsive valve 74 and has rotatably received therein a flapper valve 76 which is operable by the pressure responsive valve 74.

In operation, when the throttle lever 46 is moved into the afterburning range 57, as mentioned heretofore, the "hotstreak" ignitor mechanism 55 is energized to provide liquid fuel to the conduit 53b, thereby actuating the fuel valve 74 to the open position and permitting fuel to flow to the pilot fuel nozzle 71 and the "hotstreak" fuel nozzle 73. Also, as the fuel valve 74 moves to the open position, the flutter valve 76 is rotated to the open position, thereby admitting gaseous combustion products from the combustion chamber 22 into the chamber 64, actuating the piston member 62 upwardly, as shown in Fig. 2, and aligning the aperture 70 with the pilot fuel nozzle 71. As fuel issues from the nozzle 71, it is ignited by the flame in the combustion chamber 22 and the flame resulting therefrom is directed into the aperture 70 and the bore 68 of the tubular member 66 and proceeds therethrough in radially outwardly direction into the bypass duct 30. As it issues from the bore 68, the flame ignites the fuel issuing from the "hotstreak" ignitor nozzle 73, and the flame or "hotstreak" resulting therefrom is swept through the bypass duct 30 in axial direction to a region immediately surrounding the fuel manifold 35, thereby igniting the fuel issuing therefrom. The resulting flame is thereupon anchored upon the flameholding means 36 in the usual manner.

After the starting cycle is terminated by the "hotstreak" ignitor mechanism 55, the fuel remaining in the fuel conduit 53b is bled through the nozzles 71 and 73, whereupon the pressure responsive valve 74 returns to its original off position and rotates the valve 76 to its off position. As the valve 76 rotates to the off position, the gas pressure within the chamber 64 is reduced sufficiently so that the piston member 62 is moved radially outwardly to the position shown in Fig. 3 by the gas pressure acting on the closure wall 69, thereby concealing the gas flow aperture 70 within the duct member 61. As illustrated in Figs. 2 and 3, the piston member 62 is movable within certain limits as defined by stop members 62a and 62b.

In Fig. 6 there is shown a second embodiment illustrating a "hotstreak" ignitor device 160 which is somewhat similar to the device 60 shown in the first embodiment and having a duct member 161 connecting the main combustion chamber wall 121 to the central shell 124 of the engine. It will be understood that the wall 121 defines the outer periphery of the main combustion structure 119, while the central shell 124 defines the inner periphery of a bypass duct 130 in the manner similar to that shown in the first embodiment. Also, within the duct member 161, there is provided a piston member 162 having a central tubular member 165 sealed at one end by the wall 169 and open at the other end to the bypass duct 130. In this embodiment, the fuel conduit 53b is connected to the chamber 164 by means of a branch conduit 175 and to a hotstreak fuel ignitor nozzle 173. The fuel ignitor nozzle 173 is located within the duct 130 in alignment with the outlet 165a of the member 165 and, when the apparatus is in the non-afterburning position shown in Fig. 5, the aperture 170 in the tubular member 161 is out of communication with the combustion chamber 122.

The operation of this arrangement is as follows: When the throttle lever 46 is moved into the afterburning position 57, as mentioned heretofore in connection with the first embodiment, fuel is delivered by the conduit 53b into the chamber 164 by the conduit 175, thereby actuating the piston member 162 and its associated tubular member 165 radially inwardly and moving the aperture 170 into the combustion chamber 122, whereupon flame and gaseous combustion products therefrom are projected through the bore 168 in radially outward direction into the bypass duct 130, whereupon they ignite the fuel issuing from the ignitor nozzle 173 to light the afterburner 34 (see Fig. 1) in the same manner as described heretofore. At the end of the starting cycle, as the remaining fuel in the conduit 53b is bled through the ignitor fuel nozzle 173 the pressure value in chamber 164 falls to a value sufficient to permit the piston member 162 to move in radially outward direction to the position shown in Fig. 5.

It will be seen that the invention provides a simple, yet reliable "hotstreak" igniting device for lighting an afterburner in a duct separated from the main fuel combustion apparatus.

Although in the arrangements illustrated in the drawing, the bypass afterburner is disposed remotely from the "hotstreak" ignitor nozzles 73 and 173 in the first and second embodiments, respectively, it will be understood that the exact location is not critical and that the bypass afterburner manifold 35 may be located nearer to or farther from the ignitor nozzles.

It will also be seen that with the invention the air flowing through the bypass duct 30 is highly heated by the bypass afterburner 34 and that the volume and/or velocity thereof is amplified to increase the propulsion thrust of the engine.

Although in the arrangement illustrated, the afterburner "hotstreak" ignition system has been shown as of the type in which the main afterburner 31 is ignited at the same time as the bypass afterburner 34, it will be understood that this arrangement is not essential to the invention and that the afterburners may be ignited separately, if desired.

Also, although in Fig. 1 only one "hotstreak" fuel igniting structure has been illustrated for igniting the bypass afterburner 34, it will be understood that, if desired, two or more such devices in angularly spaced relation to each other may be provided.

While the invention has been shown in several forms, it will be obvious to those skilled in the art that it is not so limited, but is susceptible of various other changes and modifications without departing from the spirit thereof.

What is claimed is:

1. In fuel combustion apparatus including a first fuel combustion structure, a second fuel combustion structure, partition structure separating said first and second fuel combustion structures and means for igniting fuel in said first fuel combustion structure; "hotstreak" fuel ignition structure for igniting the fuel in said second fuel combustion structure comprising means providing an opening through said partition structure, a slidable valve member for blocking said opening, a "hotstreak" fuel ignitor nozzle disposed adjacent said opening and in communication with said second fuel combustion structure, means including a fuel conduit for initiating flow of fuel to said fuel ignitor nozzle for a short time period, means for concomitantly initiating flow of fuel to said second fuel combustion structure and means responsive to fuel pressure in said fuel conduit for imposing a fluid pressure on said valve member in valve opening direction, whereby to permit a flame from said first fuel combustion structure to extend through said opening and ignite fuel issuing from said "hotstreak" fuel ignitor nozzle.

2. In fuel combustion apparatus including a first fuel combustion structure, a tubular partition structure encompassing said first fuel combustion structure, tubular shell structure encompassing said partition structure and in spaced relation therewith, a second fuel combustion structure of annular shape defined by said partition and shell structures, means for injecting fuel into said first fuel combustion structure and means for igniting the fuel in said first combustion structure; "hotstreak" fuel ignition structure for igniting the fuel in said second fuel combustion structure comprising a tubular duct member extending from said first combustion structure through said partition structure and forming a connecting passageway, a piston valve member slidably received in said duct member and normally disposed in a manner to block said passageway, a fuel ignitor nozzle disposed between said partition and shell structures in a position adjacent said passageway, means including a fuel conduit for initiating flow of fuel to said ignitor fuel nozzle for a short time period, means for injecting fuel into said second fuel combustion structure, means for initiating delivery of fuel to said second fuel combustion injecting means during said time period, and means responsive to fuel pressure in said fuel conduit for imposing a fluid pressure on said piston valve member in a direction to unblock said passageway, whereby to permit a flame from said first combustion structure to extend through said passageway and ignite fuel issuing from said ignitor fuel nozzle.

3. In a fuel combustion apparatus including a first fuel combustion structure, a second fuel combustion structure, tubular partition structure separating said first and second fuel combustion structures, said partition structure encompassing said first fuel combustion structure and said second fuel combustion structure encompassing said partition structure, and means for igniting fuel in said first fuel combustion structure; "hotstreak" fuel ignition structure for igniting the fuel in said second fuel combustion structure comprising a tubular duct providing an opening through said partition structure, a valve including a piston member slidably received within said duct for blocking said opening, a "hot-streak" fuel ignitor nozzle disposed adjacent said opening and in communication with said second fuel combustion structure, means including a fuel conduit for initiating flow of fuel to said fuel ignitor nozzle for a short time period, means for concomitantly initiating flow of fuel to said second fuel combustion structure and means responsive to fuel pressure in said fuel conduit for imposing a fluid pressure on said piston member in valve opening direction, whereby to permit a flame from said first fuel combustion structure to extend through said opening and ignite fuel issuing from said "hotstreak" fuel ignitor nozzle.

4. In fuel combustion apparatus including a first fuel combustion structure, a tubular partition structure encompassing said first fuel combustion structure, tubular shell structure encompassing said partition structure and in spaced relation therewith, a second fuel combustion structure of annular shape defined by said partition and shell structures; means for injecting fuel into said first fuel combustion structure and means for igniting the fuel in said first combustion structure; "hotstreak" fuel ignition structure for igniting the fuel in said second fuel combustion structure comprising a tubular duct member extending from said first combustion structure through said partition structure, a piston valve member slidably received in said duct member and dividing the latter into two chambers, said piston valve member having an axially aligned member defining an axially extending passageway and normally disposed in a manner to block said passageway, a fuel ignitor nozzle disposed between said partition and shell structures in a position adjacent said passageway, means including a fuel conduit for initiating flow of fuel to said ignitor fuel nozzle for a short time period, means for injecting fuel into said second fuel combustion structure, means for initiating delivery of fuel to said second fuel combustion injecting means during said time period, means responsive to fuel pressure in said fuel conduit for imposing a fluid pressure on said piston valve member in a direction to unblock said passageway, whereby to permit a flame from said first combustion structure to extend through said passageway and ignite fuel issuing from said ignitor fuel nozzle, and further including means defining a second passageway connection the first fuel combustion structure and one of said chambers, means defining a second valve in said second passageway, said second valve being normally in a position to block said second passageway and movable to an unblocking position in response to fuel pressure in the fuel pressure responsive means.

5. In fuel combustion apparatus including a first fuel combustion structure, a tubular partition structure encompassing said first fuel combustion structure, tubular shell structure encompassing said partition structure and in spaced relation therewith, a second fuel combustion structure of annular shape defined by said partition and shell structures, means for injecting fuel into said first fuel combustion structure and means for igniting the fuel in said first combustion structure; "hotstreak" fuel ignition structure for igniting the fuel in said second fuel combustion structure comprising a tubular duct member extending from said first combustion structure through said partition structure and forming a connecting passageway, a piston valve member slidably received in said duct member and normally disposed in a manner to block said passageway and divide the latter into two chambers, said piston valve member having an axially aligned member extending through said passageway, a fuel ignitor nozzle disposed between said partition and shell structures in a position adjacent said passageway, means including a first fuel conduit for initiating flow of fuel to said ignitor fuel nozzle for a short time period, means for injecting fuel into said second fuel combustion structure, means for initiating delivery of fuel to said second fuel combustion injecting means during said time period, and means responsive to fuel pressure in said first fuel conduit including a second fuel conduit connecting said first fuel conduit to one of said chambers for imposing a fluid pressure on said piston valve member, whereby said piston valve is movable in response to fuel pressure in said first fuel conduit in a direction to unblock said passageway, whereby to permit a flame from said first combustion structure to extend through said passageway and ignite fuel issuing from said ignitor fuel nozzle.

References Cited in the file of this patent

UNITED STATES PATENTS

| | | |
|---|---|---|
| 2,602,293 | Goddard | July 8, 1952 |
| 2,672,726 | Wolf et al. | Mar. 23, 1954 |
| 2,673,445 | Bruckmann | Mar. 30, 1954 |